Sept. 15, 1970 J. PLUCKER III 3,528,439
VAPOR-LIQUID RATIO MONITOR
Original Filed July 5, 1966 3 Sheets-Sheet 1
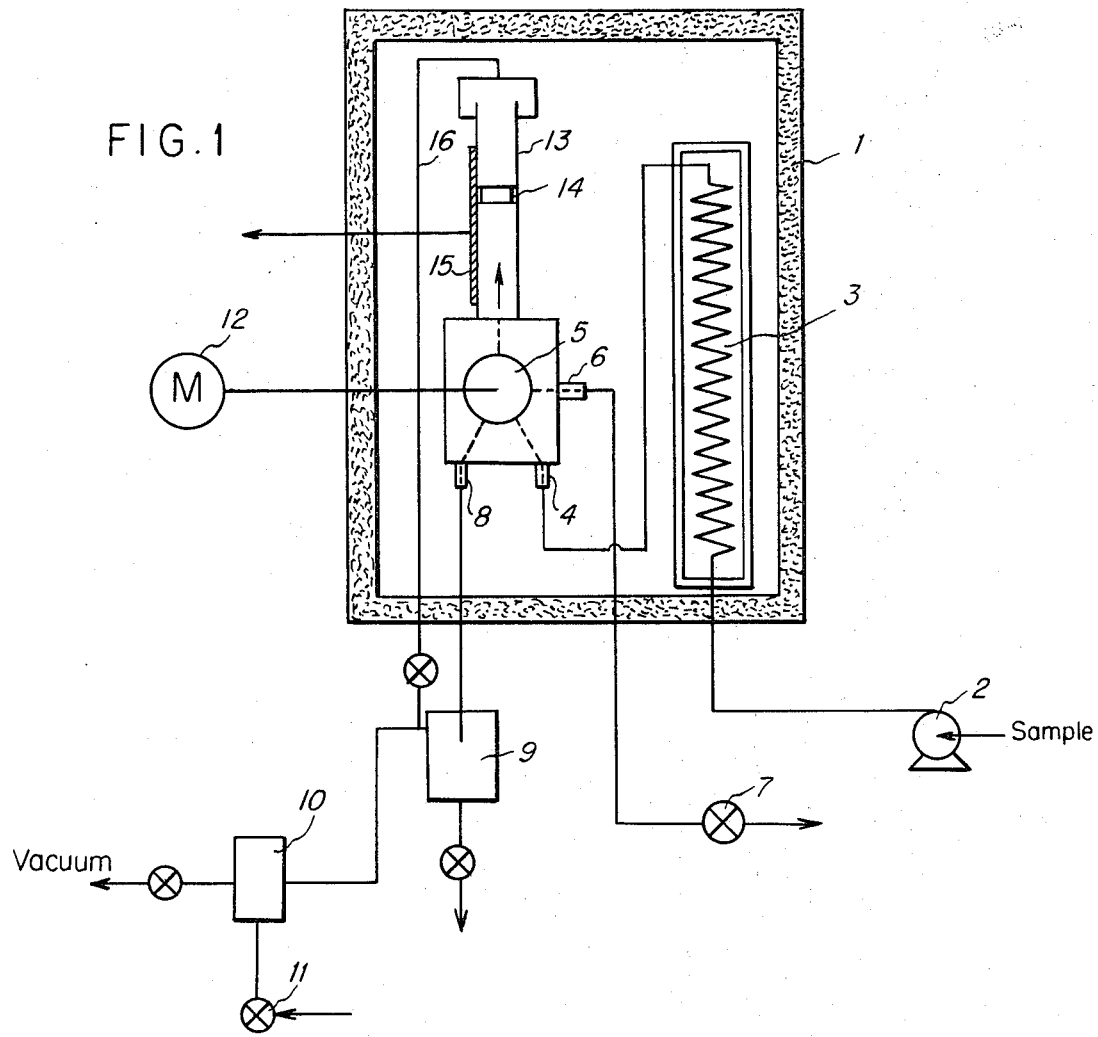
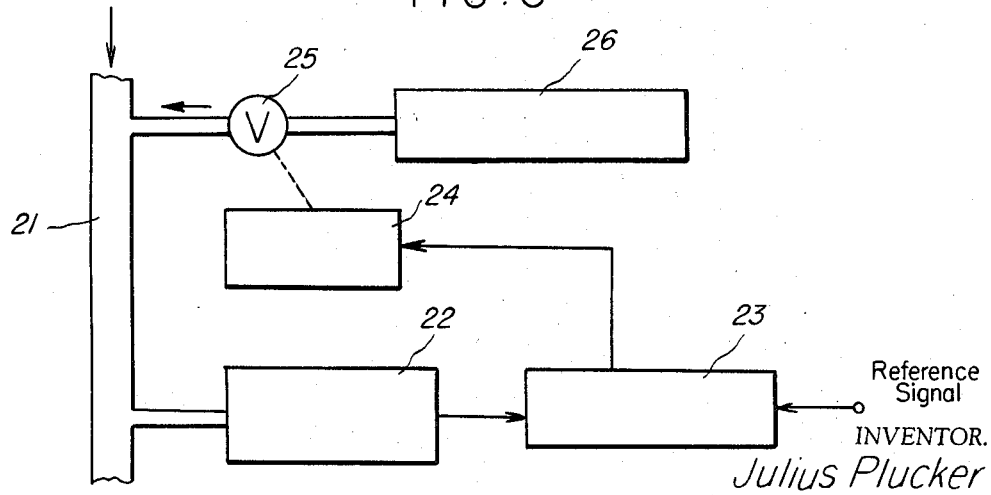
INVENTOR.
Julius Plucker III
BY
Paul H. Heller
Attorney Sept. 15, 1970     J. PLUCKER III     3,528,439
VAPOR-LIQUID RATIO MONITOR
Original Filed July 5, 1966     3 Sheets-Sheet 3

INVENTOR.
Julius Plucker III
BY Paul H. Heller
Attorney

United States Patent Office 3,528,439
Patented Sept. 15, 1970

3,528,439
VAPOR-LIQUID RATIO MONITOR
Julius Plucker III, Pitman, N.J., assignor to Mobil Oil Corporation, a corporation of New York
Continuation of application Ser. No. 562,621, July 5, 1966. This application July 23, 1969, Ser. No. 861,211
Int. Cl. F17d 1/02, 3/00; G05d 11/00
U.S. Cl. 137—3                                    14 Claims

ABSTRACT OF THE DISCLOSURE

A vapor-liquid ratio monitor comprising valve means for feeding a motor fuel sample of fixed volume to a chamber wherein vaporization of the sample acts to drive a float upwardly in the chamber. The height of the float in the chamber provides an indication of the vapor-liquid ratio of the sample.

---

This application is a continuation of application Ser. No. 562,621, filed July 5, 1966, and now abandoned.

This invention is directed to a method and apparatus for the determination of the vapor-liquid ratio characteristics of petroleum products. More particularly, this invention is directed to the continuous determination of the vapor-liquid ratio of gasoline.

The vapor-liquid ratio of gasoline is a measure of the amount of light ends present in a given fuel. This has been further defined by the ASTM as follows: Vapor-liquid ratio of a gasoline, at any specified temperature and pressure is the ratio, at that temperature and pressure of the volume of vapor in equilibrium with liquid to the volume of sample charged, as a liquid at 32° F.

The volatility characteristic of motor gasoline is recognized as an important property, from the standpoint of proper engine operation. Too large a proportion of light ends can result in a vapor-lock and other hot weather problems in engine fuel systems. Too little an amount of the light ends can adversely affect the engine starting and warm-up characteristics of the gasoline. A further important factor results from the favorable economics of blending in light products where feasible. For example, butane, a relatively low cost component, is economically upgraded by use in gasoline which is sold for a higher price. Butane has a high octane number; however, its use in gasoline is limited because of its high volatility. Therefore, a device which accurately and continuously monitors the vapor-liquid ratio of a gasoline would be of great value in producing a product of good quality at the lowest price. Such a device would also be of value as a control element for blending in the maximum amount of light products within an acceptable limit for the vapor-liquid ratio.

Even though a great need has existed for the determination of the vapor-liquid ratio of gasolines, one of the most prevalent tests for this characteristic is still its indirect measurement by the Reid Vapor Pressure method, normally in conjunction with one or more ASTM distillation point measurements. In some cases, however, it was recognized that these tests did not provide sufficient information or that the empirical correlation of the measured parameters with the actual vapor-liquid ratio was not satisfactory.

Considerable work has been done on new methods to measure the actual vapor-liquid ratio of gasoline. Data obtained by these procedures are considered to be more closely related to engine performance aspects of volatility than that obtained by the Reid Vapor Pressure and ASTM distillation. The principal drawbacks to most of these methods are the complexity of the apparatus or the procedure and the length of time necessary to obtain results. These drawbacks are particularly acute in any attempt to determine the vapor-liquid ratio continuously.

Briefly, by this invention a constant-volume sample of gasoline at a controlled temperature is periodically delivered by a rotary valve means to a calibrated glass tube. The sample partially vaporizes within the tube to a height indicated by a mercury sealed float. The float can actuate electrical sensing means which provide a direct readout of vapor-liquid ratio. After a reading is obtained, the valve is rotated to a position at which the glass tube is drained and the sample chamber is flushed and filled with a suceeding sample. To control the blending of component fluids in accordance with the sensed vapor-liquid ratio of a blended product, an error signal is developed which is representative of the deviation of the sensed vapor-liquid ratio from a predetermined reference. The error signal controls a servo motor which varies the amount of at least one component that forms a portion of the blended product. For example, in the case of a fuel stream to which butane is added as a component, the vapor-liquid ratio of the stream is monitored, and a servo motor is energized to vary the amount of butane that is added, thereby to render the vapor-liquid ratio of the stream relatively constant at a predetermined magnitude.

It is therefore an object of this invention to provide an improved method and apparatus for the direct determination of vapor-liquid ratio.

It is a further object of this invention to provide for an automatic semi-continuous determination of vapor-liquid ratio.

Moreover, it is an object of this invention to provide for the blending of light ends into a gasoline product under the control of an apparatus which determines the vapor-liquid ratio.

FIG. 1 depicts the overall arrangement of the apparatus used in this invention.

FIG. 6 depicts the use of the vapor-liquid ratio monitor as a control element in the blending of motor fuels.

Figure 2:
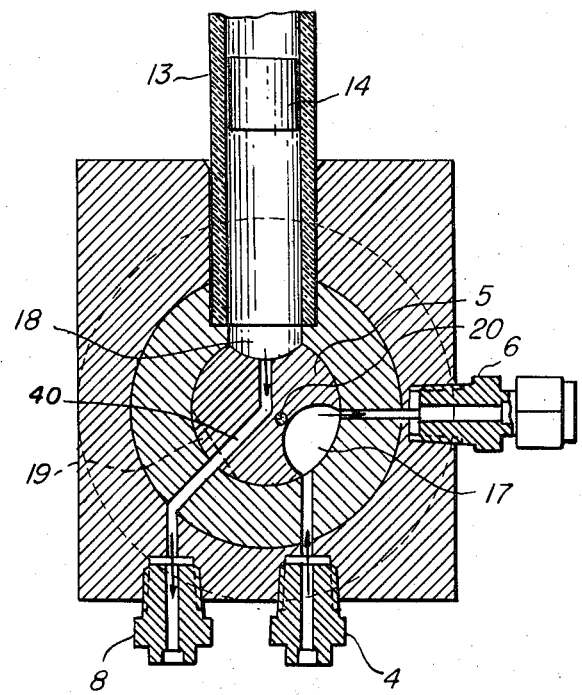
FIG. 2 is a sectional view of the rotary valve and connected portions in a filling and draining position.

Referring to FIG. 1, the apparatus of this invention is contained within an insulated housing 1. A sample stream is delivered by a pump 2 through a temperature controlled coil 3, preferably located within the housing, to the sample inlet 4. The sample stream flows to the rotary valve 5, described in detail below, and then to the outlet connector 6 and to the drain apparatus 7, including a back pressure regulator. At this position the valve is positioned so that the previous sample leaves through drain connector 8 to the liquid trap 9 and drain means comprising pressure regulator 10, air regulator 11 and vacuum source.

When the rotary valve is driven by the motor 12 to the vaporizing position, the sample is directed into a gas flow calibrator tube 13 which contains vapor-liquid ratio indicating means shown as a mercury sealed float 14. Electrical or photoelectric sensing means 15 generates a signal representative of the position of the float 14. The tube is also calibrated to provide a visual readout of the float position.

The pressure on either side of the float is equalized in the drain position by the conduit 16. The conduit 16 may be connected to conventional pressure and air regulators 10, 11, which maintain the pressure above the float constant as the float rises. For example, the pressure below the float may be maintained at a value of one standard atmosphere when the rotary valve is in the sample vaporizing position. The pressure above the float would be equal to one atmosphere minus an amount determined by the weight of the float.

FIGS. 2, 3, 4 and 5 show the rotary valve 5 in greater detail. The valve contains a sample reservoir 17, a drain cup 18 and bypass slot 19. The sample reservoir 17 should be of a known volume, or its volume relative to the volume of the expansion chamber 13 should be ascertained.

In FIG. 2, the drain cup 18 is positioned beneath the calibrator tube 13. At this point the sample will drain through drain means shown as the cup 18 and its associated conduit 40, through sample outlet means shown as the drain connector 8, as indicated by the arrows. The rate at which the sample is drained can be controlled by the pressure differential created across the seal 14 by the pressure and air regulator 10 and 11. Simultaneously, with the draining of cup 18 the sample reservoir 17 is being flushed and filled by a sample stream flowing through the sample inlet 4, and associated conduits, to sample reservoir 17 and through stream outlet means shown as the outlet connector 6 and associated conduits as indicated by the arrows.

Figure 3:
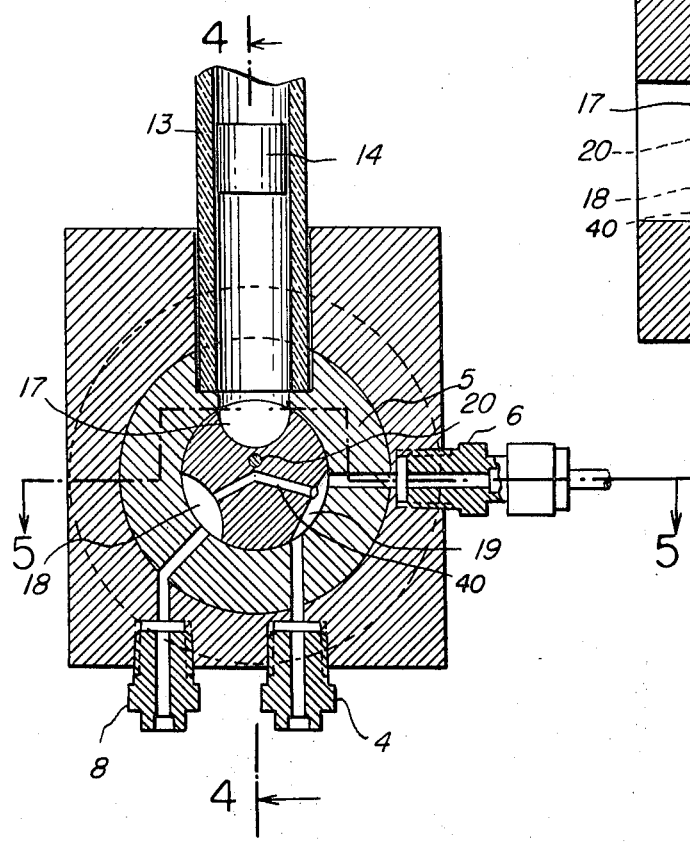
FIG. 3 shows the rotary valve in a vaporizing position, rotated 120° from the position of FIG. 2.

As depicted in FIG. 3, after a predetermined interval, the motor 12 will turn the valve 5 a suitable distance, illustrated as 120°, to position the sample reservoir beneath the calibrator tube. At this point the sample will vaporize, and the sealed float will indicate the volume of the vapors to that of the liquid. Simultaneously, the bypass slot 19 will provide a channel for the flow of the sample stream from the inlet connector 4 to the outlet connector 6. Of course, alternative means may be provided to cut off the supply of sample stream when the valve is in the sample vaporizing position. However, as depicted, the heated sample will help maintain the temperature of the valve and housing.

A further feature of the rotary valve is the provision for a thermowell 20 by which the temperature of the valve and the sample may be maintained at a predetermined level.

FIG. 6 shows an automatic monitoring and blending system in accordance with the invention. A fluid flows in a conduit 21 and is monitored by a vapor-liquid ratio monitor 22 as described above. A signal representative of the vapor-liquid ratio of the fluid is applied to a subtractor 23. The signal is generated by conventional electrical (or photoelectrical) sensing means 15 activated by the float 14. Also applied to the subtractor 23 is a reference signal representative of the vapor-liquid ratio at which it is desired to maintain the fluid. This reference signal may be generated by methods well known in the art.

The output signal from the subtractor 23 then is representative of the deviation of the vapor-liquid ratio of the fluid from that desired. This signal is applied as an error signal to servo motor 24 which is used to control the setting of a valve 25 that meters the flow of a component, such as butane, for example, for a component source 26 that is allowed to flow into the conduit 21. The valve 25 is varied until the error signal is reduced to zero, and in this fashion the fluid is continuously monitored and is combined with the component to meet a predetermined specification regarding vapor-liquid ratio.

In a specific example, the liquid metering device was a tapered stainless steel plug, one and one-quarter inch in diameter at the center of its longitudinal axis. A half inch diameter hemispheric cup of approximately 0.7 cc. capacity was milled into the plug on the one and one-quarter inch diameter center line. A drain cup was milled into the plug on the same center line at a 120° angle, counter-clockwise from the sample cup as viewed from the small end of the tapered plug. A drain line was drilled from the bottom of the cup through the plug. A bypass slot for the liquid sample was milled into the plug on the same center line at 120° counter-clockwise from the drain cup and drain line. The tapered stainless steel plug was inserted into a Teflon sleeve with a matching taper. These were then positioned in a brass lock which mated with the precision bored gas flow calibrator. The metering device was flushed and filled from the position indicated in FIG. 2. The metering device was then rotated 120° to the position indicated in FIG. 3. The pressure below the mercury sealed float was maintained at 760 mm. Hg with a nullmatic pressure regulator. The sample used was a premium grade commercial gasoline. The above procedure was followed in a test of several samples which were held at temperatures ranging from 120° F. to 134° F. by conventional temperature control apparatus. The position of the float is indicated on the abscissa of the graph in FIG. 7 at each of the respective temperatures indicated on the ordinate of said graph. In the legend these points are indicated as I.

Figure 7:
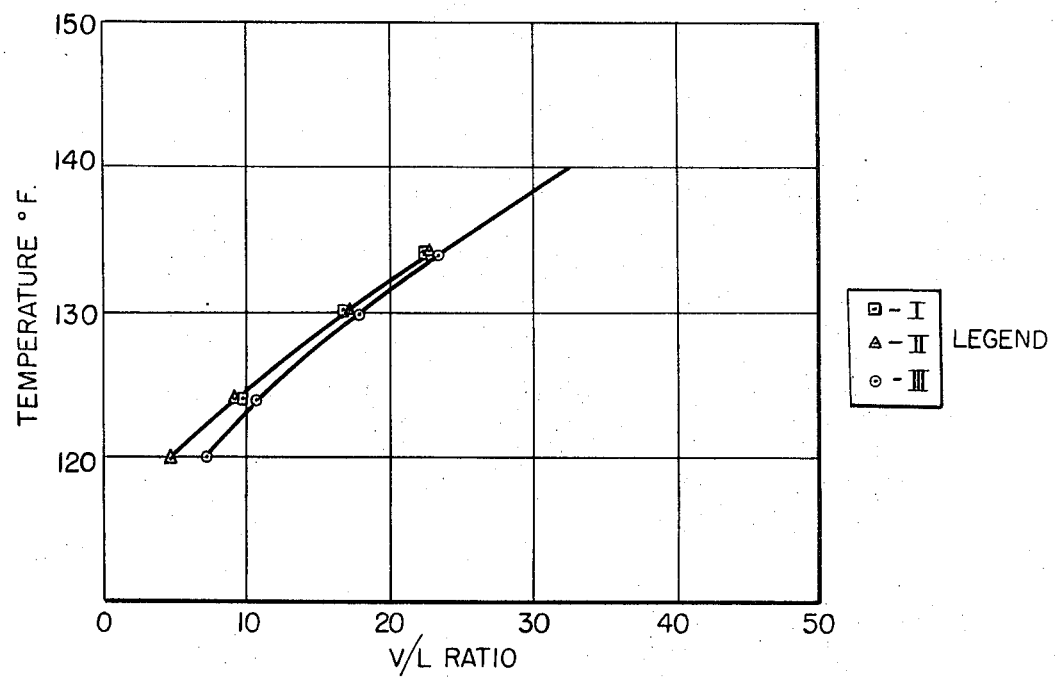
FIG. 7 is a graph which shows the vapor-liquid ratio of a gasoline at several temperatures, as determined by the methods and apparatus of this invention and the prior art.
Figure 5:
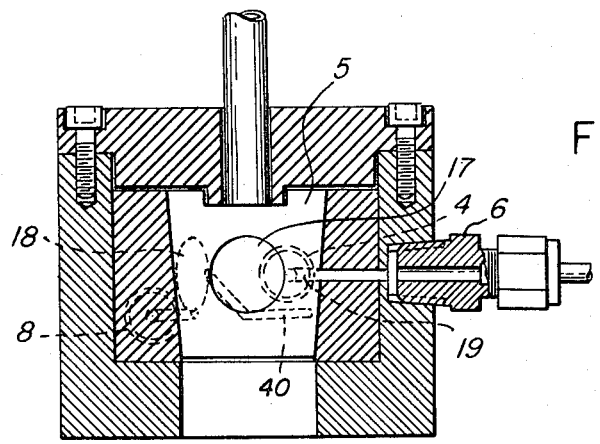
FIG. 5 is a section through 5—5 of FIG. 3.
Figure 4:
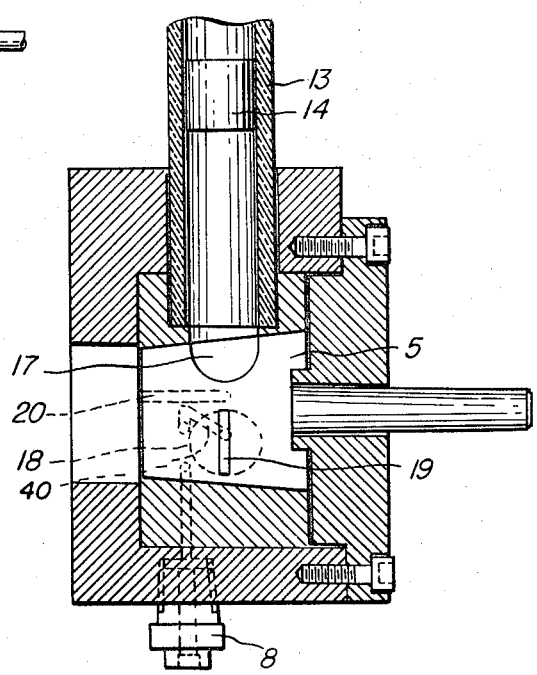
FIG. 4 is a section through 4—4 of FIG. 3.

To verify the accuracy of the method and apparatus of this invention portions of the gasoline sample referred to above were analyzed for their vapor-liquid ratio by two other methods referred to as the ASTM and Calculated methods (respectively indicated in the legend of FIG. 7 and II and III). In the ASTM method a measured volume of liquid fuel at 32–40° F. is introduced through a rubber septum into a glycerine-filled burette. The charged burette is placed in a temperature controlled water bath. The volume of vapor in equilibrium with liquid fuel was measured at each of the temperatures used above and at the same pressure, 760 mm. Hg. The vapor-liquid ratio was then calculated from the volume displaced by the vapor in the burette and from the initially measured volume of the liquid used. In the calculated method the Reid vapor pressure and the 10, 20 and 50% distillation points were determined for the given sample at each of the above temperatures. The vapor-liquid ratio was estimated from this volatility data by correlations set forth in the prior art, see 1946 CRC Handbook, pages 154 and 155. The results of these tests as indicated in FIG. 7 show that the mehod and apparatus of this invention may be used to obtain the vapor-liquid ratio of a gasoline sample which correlates well with prior art methods.

Thus, there have been described exemplary embodiments for carrying out the monitoring and blending of a fluid in accordance with vapor-liquid ratio. It will be understood by those skilled in the art that the above-described embodiments are merely exemplary and that they are susceptible to modification and variation without departing from the spirit and scope of the invention.

What I claim is:

1. Apparatus for determining the vapor-liquid ratio of a motor fuel comprising:
    an expansion chamber having a top and a bottom,
        means for supplying a predetermined volume of a sample of said motor fuel to said expansion chamber, and
    means vertically movable in sealing engagement with the internal walls of said chamber in response to the vapor pressure of said sample for indicating the vapor-liquid ratio of said sample.

2. Apparatus for determining the vapor-liquid ratio of a motor fuel comprising:
    an expansion chamber having a top and a bottom,
        means including a sample receptacle for positioning a predetermined volume of a sample of said motor fuel in sealing engagement with said bottom, and means vertically movable in sealing engagement with the internal walls of said chamber in response to the vapor pressure of said sample for indicating the vapor-liquid ratio of said sample.

3. The apparatus of claim 2 wherein said sample positioning means comprises valve means having said receptacle in the form of a sample cup for positioning a predetermined volume of said sample in sealing engagement with said bottom of said expansion chamber.

4. The apparatus of claim 3 further comprising means for sensing the position of said vapor-liquid ratio indicating means for generating a signal representative of the vapor-liquid ratio of said sample.

5. The apparatus of claim 4 wherein said valve means further comprises means including a drain cup adapted to be positioned in sealing engagement with said expansion chamber bottom for draining said expansion chamber.

6. The apparatus of claim 5 further comprising sample inlet means for providing a stream of the motor fuel to said valve means, and sample outlet means for providing an outlet for the sample from draining means; said valve means being adapted to position said sample cup alternatively in sealing engagement with said sample inlet means and with the bottom of said expansion chamber, and being further adapted to position said drain cup in sealing engagement with the bottom of said expansion chamber when said sample cup is positioned in sealing engagement with said sample inlet means whereby said drain means provides fluid communication between said expansion chamber and said sample outlet means.

7. Apparatus for determining the vapor-liquid ratio of a motor fuel comprising:
an elongated expansion chamber having a top and a bottom,
valve means having a sample cup and drain means including a drain cup,
sample inlet means for the passage of a stream of the motor fuel to said valve means, said valve means being adapted to position said sample cup alternatively in sealing engagement with said sample inlet means and with the bottom of said expansion chamber whereby a sample of the motor fuel stream is positioned at the bottom of said expansion chamber,
at least one sample outlet means for the passage of the sample from said valve means, said valve means being further adapted to position said drain cup in sealing engagement with the bottom of said expansion chamber when said sample cup is positioned in sealing engagement with said sample inlet means whereby said drain means provides fluid communication between said expansion chamber and said sample outlet means, and
means vertically movable in sealing engagement with the walls of said expansion chamber in response to the vapor pressure of the sample in said sample cup for indicating the vapor-liquid ratio of the sample.

8. The apparatus of claim 7 further comprising stream outlet means for the passage of the motor fuel stream from said valve means, said valve means being adapted to position said sample cup in sealing engagement with said stream outlet means when said sample cup is in sealing engagement with said sample inlet means.

9. The apparatus of claim 8 wherein said valve means further comprises conduit means for interconnecting said sample inlet means and said stream outlet means when said sample cup is in sealing engagement with said expansion chamber.

10. The apparatus of claim 7 further comprising means for maintaining a predetermined pressure within said chamber above said vapor-liquid ratio indicating means.

11. Apparatus for blending a motor fuel having a predetermined vapor-liquid ratio, wherein a plurality of components including at least one component which affects the vapor-liquid ratio of the motor fuel are combined in blending means, comprising
an expansion chamber having a top and a bottom,
valve means including a sample cup for positioning a sample of predetermined volume of said motor fuel in sealing engagement with said expansion chamber bottom,
conduit means for delivering a stream of the motor fuel from the blending means to said valve means,
means vertically movable in sealing engagement with the internal walls of said chamber in response to the vapor pressure of said sample for indicating the vapor-liquid ratio of said sample,
means for generating in response to the vertical movement of said vapor-liquid ratio indicating means a signal representative of the vapor-liquid ratio of said sample,
means for generating a signal representative of said predetermined vapor-liquid ratio,
means for generating an error signal representative of the difference between the sample vapor-liquid ratio signal and the predetermined vapor-liquid ratio signal, and
means for controlling the relative amount of said one component in the blending means in accordance with the magnitude of said error signal.

12. A method of determining the vapor-liquid ratio of a motor fuel comprising the steps of:
conveying a sample of predetermined volume of the motor fuel to an elongated expansion chamber thereby causing vertically movable means in sealing engagement with the internal walls of said chamber to move in response to the vapor pressure of said sample for indicating the vapor-liquid ratio of said sample,
controlling the vertical movement of said vapor-liquid ratio indicating means to provide a predetermined pressure above said sample, and
measuring the vertical movement of said vapor-liquid ratio indicating means to determine the vapor-liquid ratio of said sample.

13. A method of determining the vapor-liquid ratio of a motor fuel comprising the steps of:
conveying a sample of predetermined volume of the motor fuel to means for determining vapor-liquid ratio,
moving said sample to a location immediately adjacent the bottom of an elongated expansion chamber of said vapor-liquid ratio determining means thereby causing vertically movable means in sealing engagement with the internal walls of said chamber to move in response to the vapor pressure of said sample for indicating the vapor-liquid ratio of said sample,
controlling the vertical movement of said vapor-liquid ratio indicating means to provide a predetermined pressure below said vapor-liquid ratio indicating means, and
measuring the vertical movement of said vapor-liquid ratio indicating means to determine the vapor-liquid ratio of said sample.

14. A method of blending a motor fuel having a predetermined vapor-liquid ratio, wherein a plurality of components including at least one component which affects the vapor-liquid ratio are combined in blending means, comprising the steps of:
at least substantially continuously flowing a stream of the motor fuel from the blending means to means for determining vapor-liquid ratio;
obtaining a sample of predetermined volume from the motor fuel stream;
moving said sample to a location immediately adjacent the bottom of an elongated expansion chamber of said vapor-liquid ratio determining means thereby causing vertically movable means in sealing engagement with the internal walls of said chamber to move in response to the vapor pressure of said sample for indicating the vapor-liquid ratio of said sample;

controlling vertical movement of said vapor-liquid ratio indicating means to provide a predetermined pressure below said vapor-liquid ratio indicating means;

generating, in response to vertical movement of said vapor-liquid ratio indicating means, a signal representative of the vapor-liquid ratio of said sample;

generating a signal representative of said predetermined vapor-liquid ratio;

generating an error signal representative of the difference between the sample vapor-liquid ratio signal and said predetermined vapor-liquid ratio signal; and controlling the relative amount of said one component in the blending means in accordance with the magnitude of said error signal.

References Cited

UNITED STATES PATENTS

| | | | |
|---|---|---|---|
| 2,833,151 | 5/1958 | Harvey. | |
| 2,880,611 | 4/1959 | Herren | 73—53 |
| 3,037,375 | 6/1962 | Jacobs et al. | 73—64.2 |
| 3,045,702 | 7/1962 | Nakata. | |
| 3,103,809 | 9/1963 | Dye | 73—64.2 |
| 3,116,642 | 1/1964 | Weir. | |
| 3,145,561 | 8/1964 | Thompson | 73—64.2 |
| 3,276,460 | 10/1966 | Feld | 137—3 |

WILLIAM F. O'DEA, Primary Examiner

D. J. ZOBKIW, Assistant Examiner

U.S. Cl. X.R.

73—61.3, 64.2, 308; 137—88

PO-1050
(5/69)

UNITED STATES PATENT OFFICE
CERTIFICATE OF CORRECTION

Patent No. 3,528,439     Dated September 15, 1970

Inventor(s) JULIUS PLUCKER III

It is certified that error appears in the above-identified patent and that said Letters Patent are hereby corrected as shown below:

Column 4, at line 33, for "and" (first occurrence) read --as--. Column 5, at line 12, after "means" insert --and--.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents